United States Patent Office 3,382,337
Patented May 7, 1968

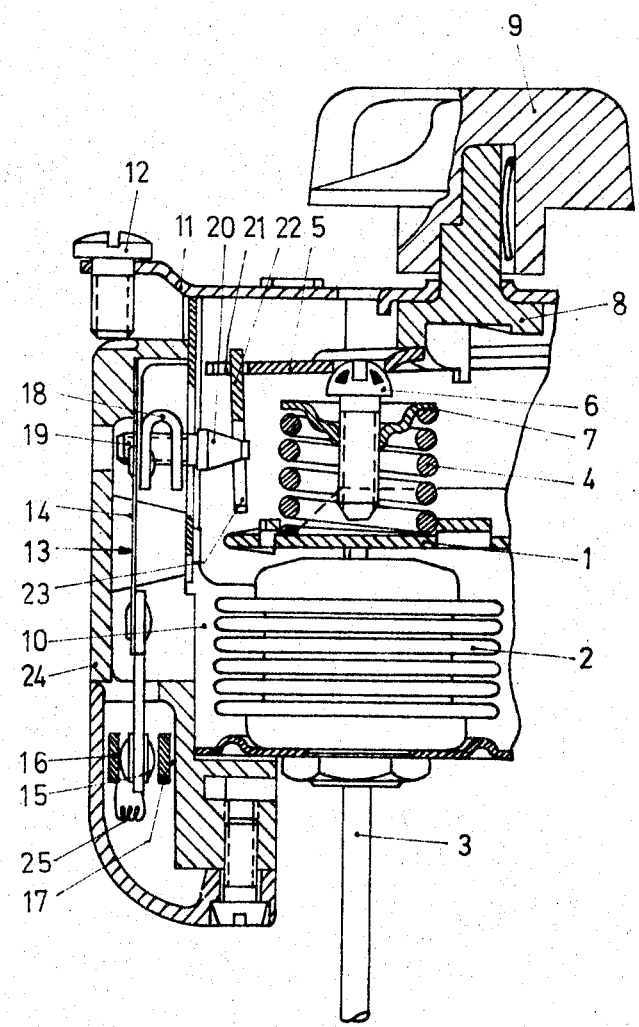

3,382,337
THERMOSTAT AND INDEPENDENT SWITCH OPERATED FROM THERMOSTAT AND INDEPENDENTLY SET
Karl Marius Larsen, Nordborg, Denmark, assignor to Danfoss A/S, Nordborg, Denmark, a company of Denmark
Filed July 5, 1966, Ser. No. 562,690
Claims priority, application Germany, July 3, 1965
D 47,653
4 Claims. (Cl. 200—139)

ABSTRACT OF THE DISCLOSURE

A temperature-responsive thermostatic system having a movable member moved in response to temperature variations being sensed by the system and effective for causing execution of a primary control function. An auxiliary switch for controlling an auxiliary control function is combined in parallel with the thermostatic system to be operated by the system at a temperature sensed by the system while carrying out its sensing for its primary control function. The auxiliary control function while being executed in response to the same thermostatic system causing execution of the primary control function is completely determined independently of the primary control function. Operator means sensing the response of the thermostatic system to temperature variations links the auxiliary switch to a temperature-responsive operator of the thermostatic system.

---

The present invention relates generally to automatic controls and more particularly to a new and improved evaporator thermostat for refrigeration, cooling or air conditioning systems and the like.

Thermostats are used in refrigeration, air conditioning and freezing box installations in order to adjust the operating temperatures. The known thermostats are provided with means for variably adjusting the operating temperature. The lower the temperature setting made on the thermostat, the longer the refrigerant compressor must operate relative to its periods of rest.

Thermostats are known in which a control circuit is controlled by auxiliary or additional contacts on the thermostat. These control circuits may be used to control and energize a lamp circuit and the like. The known thermostat arrangements with an auxiliary set-up for controlling a control circuit generally have the control circuit control dependent directly on a measured temperature being sensed and the control circuit is actuated at a value dependent upon the position of a temperature set by a control knob, like on a thermostat.

Refrigeration apparatus must sometimes be set to bypass the usual controlled operating cycle by being set to operate substantially continuously for a short time in order to effect a decreased temperature. For example, ice-cream making apparatus and freeze boxes, when refilled, the motor compressor unit may be switched to a "constant run" condition. However, if the apparatus is left on a constant run position for a longer period of time than necessary, a greater wear ensues.

The thermostat, according to the invention, provides a unitary arrangement in which the motor compressor can be controlled thermostatically and in the event that the set temperature is exceeded a control circuit is energized. The control system can, for example, control an alarm or a timed mechanism that will subsequently energize an alarm after the set temperature values have been exceeded for a selected period of time.

It is a principal object of the present invention to provide a new and improved control unit comprising a thermostat in combination with an independent switch for independently controlling a control circuit directly from the thermostatic system of the thermostat.

A feature of the control unit, according to the invention, is the provision of an auxiliary control in the nature of an auxiliary switch operated directly from a thermostat's thermostatic system for carrying out additional control functions independently of the thermostat and yet in conjunction therewith and without in any way interfering with the basic functions of the thermostat.

Another feature of the invention is the provision of temperature setting of the mechanism for setting a thermostat in the usual manner and setting a selected temperature range to be controlled by the thermostat and independently thereof setting a selected temperature within the temperature set on the thermostat, at which the auxiliary control switch mechanism will be actuated and directly operating the switch from the same thermostatic system that carries out thermostatic control.

Other features and advantages of the control unit, in accordance with the present invention, will be better understood as described in the following specification and appended claims, in conjunction with the drawing in which a fragmentary sectional view of an evaporator thermostat provided with an auxiliary switch in accordance with the invention is illustrated.

While the thermostat described hereinafter is applied to a refrigeration system and consists of an evaporator thermostat, it will be understood that units in accordance with the invention can be used for controlling thermostatically temperatures in other systems.

As illustrated in the drawing, an operator lever 1, which controls, for example, an operating circuit of a refrigerator compressor unit, not shown, is operated by a bellows 2 of a thermostatic system having a capillary tube 3 and bulb, not shown, operatively associated with a refrigerant evaporator, not shown. A control spring 4 is seated on the lever 1 and is compressed by a lifting bar 5 through a screw 6 threaded in a spring disc or seat 7 on which the control spring is seated. Variable temperature ranges to which the thermostat responds are set by a spiral cam 8 bearing on the element 5 and connected to a temperature setting knob 9 externally of a housing 10 of the thermostat.

The structure heretofore described is well known and it may be assumed that in the provision shown the control spring 4 is compressed substantially to its fullest extent so that the bar 1 can be considered as being set for closing contact mechanism, not shown, for controlling a motor compressor unit at a relatively high evaporator temperature. When the knob 9 is rotated so that the cam 8 allows the spring to extend progressively lower temperatures are set, for operation, by the thermostat. In the lowest position or operating temperature, the spiral disc cam 8 sets a temperature setting sufficiently low that the refrigerant compressor unit, not shown, being controlled by the thermostat may be assumed to remain in substantially a "constant run" position or condition.

The control unit of the invention comprises an element 11 on which is mounted a threaded adjustable screw 12 which have nothing to do with the improvements of the invention. The improved control unit comprises an auxiliary or additional control switch 13 parallel to the thermostatic system of the unit and including a movable contact consisting of a spring strip 14 which is bendable and has at a free end a movable contact 15 which cooperates with stationary contacts 16, 17, as hereinafter explained, to which a control circuit, not shown, is connected. A U-shaped holder 18 is riveted on the bendable strip 14 and has a threaded screw 19 threaded therein. The screw is provided with a tapered head 20 to provide variable selection of a selected temperature as hereinafter described. The screw 19 and the bar 5 form part of operator means for directly operating the switch mechanism of the invention as hereinafter discussed at length. A free end 21 of the bar 5 has an operating element 22 provided with a slot 23 through which the tapered head 20 extends. The auxiliary switch mechanism is housed within a housing 24 which jointly with housing 10 forms a unitary housing for the thermostat and the auxiliary switch mechanism.

In the operating position illustrated of the auxiliary switch mechanism, the contact 15 is an electrical connection with a stationary contact 16 through a conductor 25. It is assumed that in this position illustrated the control circuit connected to stationary contacts 16, 17 is in a deenergized condition. It can be seen that if the bar 5 is caused to move upwardly in excess of a temperature setting determined by the control elements of the thermostat, a lower end of the slot 23 will engage the operator screw 19 bending or deflecting the strip 13 in a direction for causing the movable contact 15 to make electrical contact with the stationary contact 17, thereby changing the operative condition of the switch to a closed condition so that the control circuit, not shown, is energized and the control function will take place. For example, if it is assumed that a signal lamp is controlled by control or indicating circuitry, connected to the stationary contacts and not shown, and the thermostat is set for a "constant run" condition as heretofore described, once the lowest temperature of the setting is reached, or exceeded, the auxiliary switch will be actuated to the closed position.

While the switch mechanism is operated directly from the thermostatic system of the thermostat, it can be seen that an opening is provided in the housing 24 through which the screw 20 can be variably adjusted, for example, with a screw engaging an end slot on the screw, axially to change the point at which the lower end of the slot 23 will engage the tapered head 20 so that an independent control temperature setting for selecting a selected temperature corresponding to a terminal temperature of or outside of the temperature range set with the control knob 9 may be set in the unit. For example, the selected or set temperature for controlling the switch may be chosen such that the operating temperature set by the thermostatic system is such a low temperature that the motor is in a "constant run" condition and only when this low temperature is exceeded will the selected temperature for effecting actuation or energization of the control circuit obtain.

The control or auxiliary switch 13 is caused to open when the temperature at which the switch was closed has increased so that the screw 19 is no longer deflected upwardly and the bendable strip 14 will restore itself to the position, illustrated, electrically in contact with the stationary contact 16. The control circuit, not shown, can of course have any kind of control mechanism connected thereto such as an accoustical signal or visual signal or an alarm system or the circuit can be closed to apply a control current or voltage to whatever element is to be controlled from the control circuit. Moreover, it will be understood that the operating conditions may be "on" or "off" conditions and the condition in which the switch is shown may be either an "on" condition or an "off" condition, depending upon the function to be carried out.

While a preferred embodiment of the invention has been shown and described, it will be understood that many modifications and changes can be made within the true spirit and scope of the invention.

What I claim and desire to secure by Letters Patent is:

1. In combination, an adjustable temperature-responsive thermostatic system having a movable member movable in response to temperature variations sensed by said system and effective for causing execution of a primary control function, variable means in said system for variably establishing a range of temperatures at which said movable member of said system causes execution of said primary control function at selected temperatures, means responsive to the same temperature-responsive thermostatic system for causing execution of an auxiliary control function without dependence upon the primary function or the range of temperatures or temperatures selected for execution of said primary function and responsive to said movable member and the movement thereof to said temperature variations being sensed, the last-mentioned means comprising a switch having at least two contacts comprising a stationary contact, a movable contact, operator means for operating said contacts to an operative position and actuated by said movable member at a temperature being sensed by said thermostatic system different than at which said primary control function is caused to be executed without other adjustment of said thermostatic system and without variation of said primary control function.

2. The combination according to claim 1, including means to variably set the last-mentioned temperature without change to temperature setting by said variable means and without variation of operation of said thermostatic system.

3. The combination according to claim 1, in which said means to variably set said last-mentioned temperature comprises a part of said operator means.

4. The combination according to claim 1, in which said operator means comprises means to operate said switch in a parallel mode of operation with the thermostatic system.

References Cited

UNITED STATES PATENTS

| 2,578,340 | 12/1951 | De Lancey. | |
| 2,758,178 | 8/1956 | Eskin | 200—140 |
| 3,283,099 | 1/1966 | Liebermann et al. | 200—140 |

FOREIGN PATENTS 733,492   7/1955   Great Britain.

BERNARD A. GILHEANY, *Primary Examiner.*

H. A. LEWITTER, *Assistant Examiner.*